(12) United States Patent
Kanso et al.

(10) Patent No.: US 8,738,968 B2
(45) Date of Patent: May 27, 2014

(54) CONFIGURATION BASED SERVICE AVAILABILITY ANALYSIS OF AMF MANAGED SYSTEMS

(75) Inventors: Ali Kanso, Montreal (CA); Maria Toeroe, Montreal (CA); Ferhat Khendek, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 261 days.

(21) Appl. No.: 13/403,650

(22) Filed: Feb. 23, 2012

(65) Prior Publication Data

US 2012/0233501 A1    Sep. 13, 2012

Related U.S. Application Data

(60) Provisional application No. 61/450,483, filed on Mar. 8, 2011, provisional application No. 61/491,653, filed on May 31, 2011.

(51) Int. Cl.
  *G06F 11/00* (2006.01)
(52) U.S. Cl.
  USPC .......................................... 714/40; 714/47.2
(58) Field of Classification Search
  USPC ....................................................... 714/47.2
  See application file for complete search history.

(56) References Cited

U.S. PATENT DOCUMENTS

| | | | |
|---|---|---|---|
| 6,601,186 B1 * | 7/2003 | Fox et al. ...................... 714/4.12 |
| 6,691,244 B1 * | 2/2004 | Kampe et al. ................... 714/4.1 |
| 6,854,069 B2 * | 2/2005 | Kampe et al. ................. 714/4.12 |
| 7,143,167 B2 * | 11/2006 | Kampe et al. ................. 709/226 |
| 7,424,701 B2 * | 9/2008 | Kendall et al. ................. 717/105 |
| 8,006,130 B2 * | 8/2011 | Kanso et al. ..................... 714/13 |
| 8,584,090 B2 * | 11/2013 | Salehi et al. ................... 717/124 |
| 2001/0054095 A1 * | 12/2001 | Kampe et al. .................. 709/223 |
| 2002/0007468 A1 * | 1/2002 | Kampe et al. ...................... 714/4 |
| 2004/0216147 A1 * | 10/2004 | Yanosy et al. ................. 719/328 |
| 2009/0164767 A1 * | 6/2009 | Kanso et al. ..................... 713/1 |
| 2009/0164832 A1 * | 6/2009 | Kanso et al. ..................... 714/1 |
| 2010/0125746 A1 * | 5/2010 | Herrmann et al. ................ 714/1 |
| 2011/0270595 A1 * | 11/2011 | Salehi et al. ....................... 703/6 |
| 2012/0192157 A1 * | 7/2012 | Salehi et al. ................... 717/126 |

OTHER PUBLICATIONS

Int'l Search Report PCT/IB2010/051051 dated Jun. 19 2012.
"Availability Management Framework SAI-AIS-AMF-B.04.01", *Service Availability Forum Application Interface Forum Application interface Specification*; Oct. 21, 2008, pp. 1-452.

(Continued)

*Primary Examiner* — Kamini Patel
(74) *Attorney, Agent, or Firm* — Blakely, Sokoloff, Taylor & Zafman, LLP

(57) ABSTRACT

An Availability Management Framework (AMF) configuration describes how configuration entities of a highly available system are grouped and includes information on service provision and service protection policies against resource failure. The AMF configuration defines a set of failure types for each component and each node, and specifies a failure rate and a recommended recovery for each failure type. A method for evaluating service availability receives the AMF configuration as input, and analyzes it to obtain an actual recovery that the highly available system is to perform when the given component fails. The method maps the AMF configuration to a stochastic model that captures the dependencies among the components and among the configuration entities at multiple levels of the hierarchy. The method utilizes the model to calculate the service availability of the AMF configuration based on the failure rate, the actual recovery and the dependencies.

21 Claims, 11 Drawing Sheets

AN EXAMPLE OF AMF CONFIGURATION

(56) References Cited

OTHER PUBLICATIONS

Ali, "Error escalation policy of AMF is not working", http://devel.opensaf.org/ticket/999, Apr. 19, 2010, paragraphs 1-4 of the description.

Bergstrom, "OpenSAF Versions of SMF Campaign and ETF schema files", Jun. 2, 2010, http://devel.opensaf.org/hg/opensaf/file/131709598f27/osaf/services/saf/smfsv/schema/SAI-AIS-SMF-ETF-A.01.02_OpenSAF.xsd.

Gherbi, et al., "A Tool Suite for the Generation and Validation of Configurations for Software Availability", *Automated Software Engineering, 2009. ASE '09. 24th IEEE/ACM Int'l Conf on, IEEE*, Piscataway, NJ, USA, Nov. 16, 2009, pp. 671-673.

Kanso, et al., "Generating AMF Configurations from Software Vendor Constraints and User Requirements", *2009 International Conference on Availability, Reliability and Security, International Conference*, 2009, Mar. 16, 2009, pp. 454-461.

Kishor, et al., "Modeling High Availability", *Dependable Computing, 2006, PRDC '06, 12th Pacific Rim International Symposium on IEEE*, Dec. 1, 2006, pp. 154-164.

Muppala, et al., "Stochastic Reward Nets for Reliability Prediction", http://people.ee.duke.edu/kst/spn_papers/reliability.pdf, Jul. 1, 1994, pp. 1-21.

Wang, et al., "Modeling User-Perceived Servie Availability", *Service Availability lecture Notes in Computer Science,* Springer, Berlin, DE, pp. 107-122. Jan. 1, 2005.

W. Xie; H. Sun; Y. Cao; K. Trivedi; "Modeling of user perceived webserver availability". In: *ICC '03. IEEE International Conference on Communications* , vol. 3, no., pp. 1796-1800 vol. 3, May 11-15, 2003.

I. Majzik , A. Pataricza , A. Bondavalli; "Stochastic dependability analysis of system architecture based on UML models", *Architecting dependable systems*, Springer-Verlag, Berlin, Heidelberg, 2003.

A. Bondavalli; I. Majzik; I. Mura; "Automatic dependability analysis for supporting design decisions in UML," In: *4th IEEE International Symposium on High-Assurance Systems Engineering*, vol., no., pp. 64-71, 1999.

L. Capretz, M. Capretz, D. Li, "Component-based software development," *Industrial Electronics Society, 2001, The 27th Annual Conference of the IEEE*, vol. 3 , 2001, pp. 1834-1837.

M. Aoyama, New Age of Software Development: How Component-Based Software Engineering changes the way of Software Development, *1998 International Workshop on CBSE*.

I. Crnkovic,M. Larsson, O. Preiss, Concerning predictability in dependable component based systems: classification of quality attributes, *Lecture Notes in Computer Science 3549*, Springer, 2005; 257-278.

P. Felber , P. Narasimhan, Experiences, Strategies, and Challenges in Building Fault-Tolerant CORBA Systems, *IEEE Transactions on Computers*, v.53 n. 5, p. 497-511, May 2004.

R. Reussner , H. Schmidt , I. Poernomo, Reliability prediction for component-based software architectures, *Journal of Systems and Software*, v.66 n. 3, p. 241-252, Jun. 15, 2003.

M.J. Harrold, D. Liang, S.Sinha, An approach to analyzing and testing component-based systems. In: *First International ICSE Workshop on Testing Distributed Component-Based Systems*, Los Angeles, CA (1999) 333-347.

X. Cai, M. R. Lyu, K. F. Wong, and R. Ko, "Component-based software engineering: Technologies, development frameworks, and quality assurance schemes," in *Proc. Asia-Pacific Software Engineering Conf.*, Dec. 2000, pp. 372-379.

J. Voas, "Error propagation analysis for COTS systems," *Computing & Control Engineering Journal* , vol. 8, No. 6, pp. 269-272, Dec. 1997.

A. Mohamed, M. Zulkernine, "On Failure Propagation in Component-Based Software Systems," 2008. *QSIC '08. The Eighth International Conference on Quality Software* , vol., no., pp. 402-411, Aug. 12-13, 2008.

A. Mohamed, M. Zulkernine, "Failure Type-Aware Reliability Assessment with Component Failure Dependency," in *proc. the Fourth International Conference on Secure Software Integration and Reliability Improvement (SSIRI)*, vol., no., pp. 98-105, Jun. 9-11, 2010.

H. Singh, V. Cortellessa, B. Cukic, E. Gunel, and V. Bharadwaj. A bayesian approach to reliability prediction and assessment of component based systems. In *Proc. of 12th International Symposium on Software Reliability Engineering (ISSRE '01)*, 2001.

V. Cortellessa , H. Singh , B. Cukic, Early reliability assessment of UML based software models, *Proceedings of the 3rd international workshop on Software and performance*, Jul. 24-26, 2002, Rome, Italy.

S.M Yacoub. B.Cukic,H.H. Ammar, "A component-based approach to reliability analysis of distributed systems," *Reliable Distributed Systems, 1999. Proceedings of the 18th IEEE Symposium on* , vol., no., pp. 158-167, 1999.

S. Bernardi, J. Merseguer: A UML profile for dependability analysis of real-time embedded systems: In: *Proc. of WOSP*, Feb. 2007, pp. 115-124. ACM, New York (2007).

Service Availability Forum, *Application Interface Specification. Availability Management Framework SAI-AIS-AMF-B.04.01*. URL: http://www.saforum.org <http://www.saforum.org>.

Wang, D/ , et al., Modeling User-Perceived Service Availability In: Malek M. Nett, e. Suri, N. (eds.) *ISAS 2005, LNCS*, vol. 3694, pp. 107-122, Springer, Heidelberg, 2005.

\* cited by examiner

CONFIGURATION BASED SERVICE AVAILABILITY ANALYSIS OF AMF MANAGED SYSTEMS

CROSS-REFERENCE TO RELATED APPLICATIONS

This application claims the benefit of U.S. Provisional Application No. 61/450,483, filed Mar. 8, 2011, and U.S. Provisional Application No. 61/491,653, filed May 31, 2011, both of which are hereby incorporated by reference.

TECHNICAL FIELD

Embodiments of the invention relate to the Availability Management Framework (AMF).

BACKGROUND

Highly available systems are fault tolerant systems with no single point of failure. Highly available services are typically provided by large and complex systems built from Commercial-Of-The-Shelf (COTS) components. Such systems are deployed on top of standardized middleware services that manage service availability by monitoring component health and by shifting workload from a faulty component to a healthy one.

The Service Availability Forum (SA Forum) is a consortium of industry-leading companies promoting a set of open specifications that enables the creation and deployment of highly available, mission critical services. As a standardization body, the SA Forum has defined a set of open specifications for middleware services including the Availability Management Framework (AMF) for supporting and managing service availability (see, *SA Forum, Application Interface Specification, Availability Management Framework SAI-AIS-AMF-B.* 04.01). Specifically, the AMF specification describes a middleware service, which is responsible for maintaining and managing the high availability of the services provided by applications. The AMF specification aims at reducing the application development time and cost by shifting the availability management from applications to this middleware service. This middleware service (referred to hereinafter as the AMF) manages the redundancy of the components of an application and dynamically assigns the workload to each component.

Researchers have developed various techniques for analyzing the availability of a highly available system. However, existing techniques do not target the availability analysis of AMF configurations in a generic context.

For example, a runtime system can be modeled with Markov chains and its availability can be analyzed based on data collected at runtime (D. Wang, K. S. Trivedi, "Modeling User-Perceived Perceived Service Availability" In the Proc. of Second International Service Availability Symposium, (ISAS) LNCS Vol. 3694, pp 107-122 Berlin, Germany, Apr. 25-26, 2005). Their work does not present a generic method for the availability analysis of AMF configurations; instead it defines a model for a particular runtime system. As a consequence of not defining a generic approach, their analysis cannot be reused in a generic context for evaluating the availability of the services in any AMF configuration.

There are other works that target the availability analysis in a more generic context and are specified in the Unified Modeling Language (UML) (see, e.g., A. Bondavalli, Majzik, Mura, "*Automatic dependability analysis for supporting design decisions in UML,*" 4th IEEE International Symposium on High-Assurance Systems Engineering, vol., no., pp. 64-71, 1999). Their work describes stochastic model that can be subsequently solved to quantify the expected availability. However, their work does not target AMF configurations, and the constructs of the model that they use to describe the system are not aligned with the constructs specified in AMF configurations.

SUMMARY

A computer-implemented method, system and computer product for evaluating service availability of an AMF configuration. An AMF configuration describes how configuration entities of a highly available system are grouped and includes information on service provision and service protection policies against resource failure. The AMF configuration includes a hierarchy of the configuration entities, with components being at a lowest level in the hierarchy and nodes providing an execution environment for the components.

According to one embodiment of the invention, a method is implemented on a computer system for evaluating service availability of an AMF configuration. The method receives the AMF configuration as input. The AMF configuration defines a set of failure types for each component and each node, and specifies a failure rate and a recommended recovery for each failure type. The method analyzes the AMF configuration, based on the recommended recovery for a given one of the components and a set of recovery altering attribute values defined in the AMF configuration, to obtain an actual recovery that the highly available system is to perform when the given component fails. The recovery altering attribute values are defined for the configuration entities at multiple levels of the hierarchy. The method maps the AMF configuration to a stochastic model that captures the dependencies among the components and among the configuration entities at multiple levels of the hierarchy. The method utilizes the model to calculate the service availability of the AMF configuration based on the failure rate, the actual recovery and the dependencies to thereby estimate the availability of the services to be provided by the highly available system.

According to another embodiment of the invention, a computer system that includes memory and a processor is adapted to perform the above-described method of evaluating service availability of an AMF configuration.

According to yet another embodiment of the invention, a non-transitory computer readable storage medium stores instructions that, when executed by a computer system, cause the computer system to perform the above-described method of evaluating service availability of an AMF configuration.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention is illustrated by way of example, and not by way of limitation in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect

DETAILED DESCRIPTION

Figure 1:
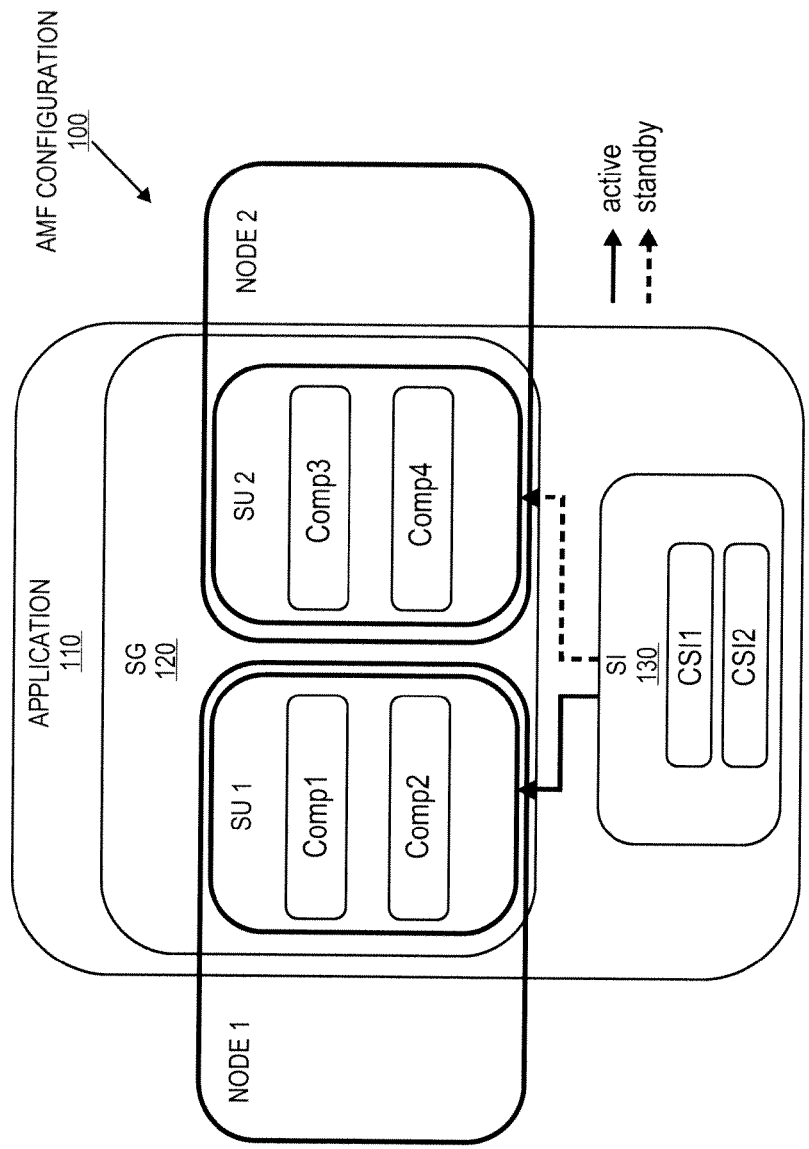
FIG. 1 illustrates an example of an AMF configuration.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention allow a system designer or administrator to anticipate, at system design time, the achievable runtime service availability. In particular, embodiments of the invention quantify, at system configuration time, the service availability that can be expected at runtime from a particular AMF configuration. This service availability can be used to compare different configurations of a system. This service availability can also be used as the basis for determining whether the system can meet its requirements stated, for example, in a Service Level Agreement (SLA).

The availability quantification described herein is based on an AMF configuration. An AMF configuration is defined at configuration time, and used by the AMF at runtime. This AMF configuration describes, among others: (1) the grouping of an application's components, their dependencies and the services they provide; (2) the selected protection policy specifying how to protect the services against failures, e.g. which redundancy model to use, how many active/standby assignments are needed, etc.; (3) the recovery policy to be executed at runtime to recover the services provided by a failed component. The recovery policy describes the runtime recovery behavior, which includes default recommended recoveries for each component, the escalation policies in case a particular recovery fails, etc. An AMF configuration also includes a number of attributes. The values of these attributes can be used to determine how to recover services at runtime and therefore the availability of an application's services.

Embodiments of the invention provide a method that quantifies the expected runtime availability of the services specified in an AMF configuration. The method is applied at configuration time, and thus requires no runtime information. The method takes an AMF configuration as input. The input AMF configuration includes failure information, such as the reliability of the components and nodes composing the system in terms of failure rates and associated recommended recoveries. The method analyzes the AMF configuration to determine the actual recovery actions based on the setting of relevant configuration attributes. In one embodiment, the analyzed configuration can be mapped to a stochastic model that incorporates dependency information among the elements of the AMF configuration. This stochastic model can be solved using off-the-shelf analysis tools.

Before describing embodiments of the invention, it is useful to explain some concepts of AMF configurations that are used throughout the description. An AMF configuration describes the configuration of a component-based system being managed by the AMF. An AMF configuration is an instance of an AMF configuration model specified in a Unified Modeling Language (UML) class diagram. The configuration model abstracts the components and the services they provide and describes the grouping of the components, their collaboration and their dependencies in association with the provided services. More specifically, the configuration model defines the concepts that support the availability management of a system. For the sake of simplicity, the following description only presents the concepts that are needed for availability analysis; the rest will be omitted.

The basic building block of a configuration model is the component, which abstracts a set of software/hardware resources. Components can be deployed on nodes. The nodes provide an execution environment for the components and include virtual machines and hardware such as e.g., processors, computers, or other processing hardware. The service(s) provided by the component is represented by a component-service-instance (CSI). Components that closely collaborate and that must be collocated to provide an integrated service are grouped into a service-unit (SU). A set of redundant SUs that collaborate to provide and protect a set of services form a service-group (SG). It is in the context of a SG that service availability management takes place. In other terms, the services are provided by SUs and protected against failures within a SG. An application is a set of SGs. These different configuration entities identify different increasing fault zones, which are the scopes that can be isolated and repaired to isolate a fault. It is the responsibility of the system integrator to dimension the scope of those SUs and SGs, and to define the recovery policies associated with them so that they are appropriate for the targeted level of service availability.

FIG. 1 illustrates an example an AMF configuration 100 of a system that runs an application 110. The AMF configuration 100 includes a SG 120 formed by two SUs (SU1, SU2), each having respectively two components. Each set of two components runs on a different node (node 1, node 2). The SG 120 provides one service-instance (SI) 130 with two CSIs (CSI1, CSI2) at runtime. According to the AMF configuration 100, the AMF makes the proper (active/standby) assignment of the SI 130 to the SUs.

In one embodiment, the availability of a given AMF configuration can be evaluated with the following steps:

Receive an AMF configuration as input that includes failure information.

Run an actual recovery analysis, which, based on the configuration attributes, determines for each failure the actual recovery that will be performed to recover from that failure.

Map the AMF configuration to a stochastic model that captures the AMF runtime behavior.

Feed the model to an analysis tool that can solve the model and calculate the expected service availability for each service.

I. Adding failure information to an input AMF configuration. Two entities in an AMF configuration that are susceptible to failures are the component and the node. Therefore, as the first step of the availability evaluation, failure information is added to each node and each component of an input AMF configuration. In one embodiment, the failure information includes applicable failure types as well as the failure rate and the recommended recovery for each applicable failure type. Examples of failure types include no response to callback (i.e., timeout), process death/crash, out of memory, node failure, etc.

To accommodate the additional information, the standard AMF configuration model describing the input AMF configuration can be extended with classes that associate the component and the node with statistical failure information. This statistical failure information can be provided by the software or hardware vendor, or obtained through benchmarks.

Figure 2:
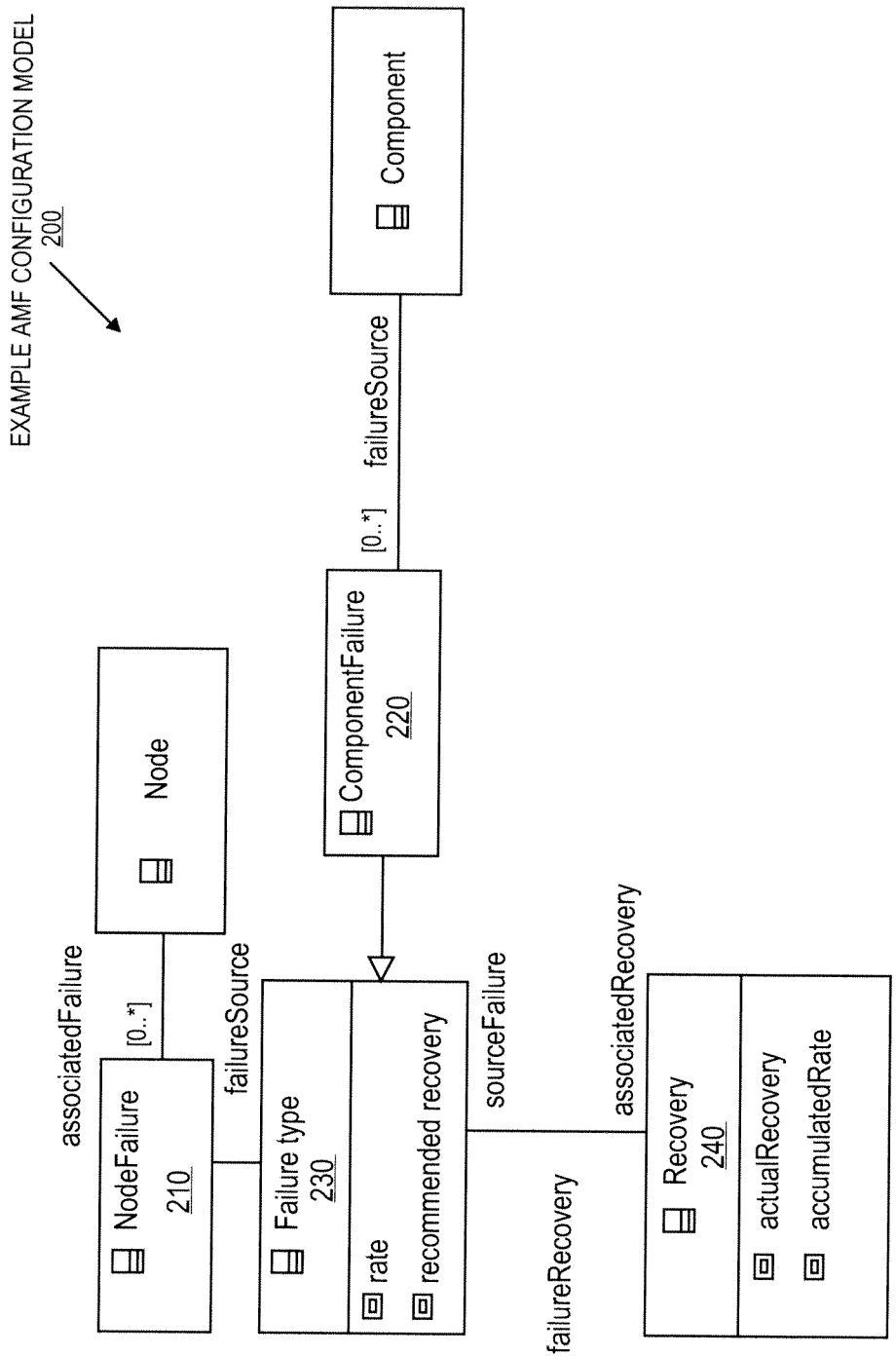
FIG. 2 illustrates an example of a portion of an AMF configuration model described in a UML class diagram according to one embodiment of the invention.

FIG. 2 illustrates an example 200 of an extension to the standard AMF configuration model in a UML class diagram. To simplify the discussion, only the node and the component, which are the entities susceptible to failure in the standard AMF configuration model are presented. Although not shown in FIG. 2, the standard AMF configuration model includes attributes associated with the protection policies and recovery policies, such as the number of components assigned active/standby on behalf of a component-service, restrictions on standard recoveries, etc. These attributes can be configured by a system integrator designing the configuration at configuration time.

The extension to the AMF configuration model defines several concepts for supporting availability analysis. In the embodiment of FIG. 2, the portion that is extended from the standard AMF configuration model includes classes 210, 220, 230 and 240. The classes 210, 220 and 230 include statistical failure information such as failure rate and recommended recovery. The availability evaluation method described herein receives this statistical failure information as part of the input AMF configuration. These classes 210, 220 and 230 allow each node and each component to be associated with a number of failure types, each characterized by a failure rate and a recommended recovery. The class 240 provides actual recovery information and is generated during the next step of the availability evaluation.

II. The actual recovery analysis algorithm. The actual recovery that the AMF will perform at runtime may not always be the same as the recommended recovery. The recommended recovery may be configured as the default setting or recommended through an application programming interface (API); e.g., an error reporting facility or some embedded program. The recommended recovery may not suit all configurations and may need to be tuned to better suit a particular configuration. For example, a system integrator may decide that when Comp1 and Comp2 of FIG. 1 are put together, the two components need to fail together regardless the recommended recovery. Therefore, the system integrator may set the appropriate configuration attribute for SU1 that overrides their recommended recovery. The software vendor's recommended recovery is typically within the scope of the component they deliver, such as a "restart" or "failover" the component. However, the vendor is agnostic to how the SUs are formed; therefore there is no recommended recovery at the SU level.

An AMF configuration model includes attributes that allow the mutation of certain recommended recoveries into different recoveries, namely, the actual recoveries. With a particular setting of the AMF attributes, a configuration designer can craft more suitable recoveries and force the AMF to execute them when needed. The actual recovery analysis can be performed on an input AMF configuration that has the failure information described in the previous step. For the purpose of the analysis, the resulting actual recovery can override the recommended recovery information whenever necessary.

In one embodiment, a recommended recovery can mutate into an actual recovery through recovery altering attributes. These recovery altering attributes may alter a triggered recommended recovery into a different recovery more suitable for the given context. The following set of recovery altering attributes have been identified for AMF configurations:

Component disable restart (defined for a component): Typically used when the component restart expected to cause a longer service outage than the failover, a system integrator can disable it, thus forcing the AMF to failover the services even if the recommended recovery is to restart the faulty component.

SU failover (defined for a SU): When the components of a SU are tightly coupled with service dependency and therefore do not provide fault isolation, a system integrator can use this attribute to specify that all components of the SU must failover together, since the failure may have propagated to all of them.

Component restart tolerance (defined at the SG level): It defines whether the restart of any component in the SG should escalate to the restart of the entire SU. It correlates repeated component failures within the same SU, assuming that the fault may manifest in other than the faulty component or has propagated to all components of the SU and therefore only the restart of the SU can guarantee the full recovery. It applies to all SUs of a SG.

SU restart tolerance (defined at the SG level): It defines whether the restart of any SU in the SG should escalate to the failover of the SU. Again here, when the performed restart of a SU could not guarantee the recovery, the AMF escalates the restart to a failover.

SU failover tolerance (defined at the node level): It defines whether any SU failover at the node level escalates to failing over all of the SUs hosted on the node. The assumption is that the root cause of repeated SU failovers on the same node indicates corruption at the node level.

Enable auto-repair (defined for a node or a SG): This attribute specifies whether the AMF is allowed to engage in the repair of the faulty entity in addition to recovering the service. When it is set to false, the AMF is not allowed to perform a recovery action that implies a simultaneous repair, e.g., component/application restart and node/cluster reboot. In other terms, the AMF may only recover the services by failing them over to the available redundant replicas and disable the faulty entity without attempting a repair. This attribute is applicable to all components of the node or the SG for which this attribute is set.

The effect of setting these configuration attributes can be determined using an actual recovery algorithm captured through the flowcharts illustrated in FIGS. 3, 4A, 4B, 5A, and 5B. Recovery analysis is performed for each failure type of each component in an input AMF configuration. The recovery altering attributes are analyzed as they apply in the context of the selected component. Note that for AMF nodes recoveries typically cannot be altered; hence they are not included in this analysis. If needed, the nodes can be analyzed in a similar way.

Figure 3:
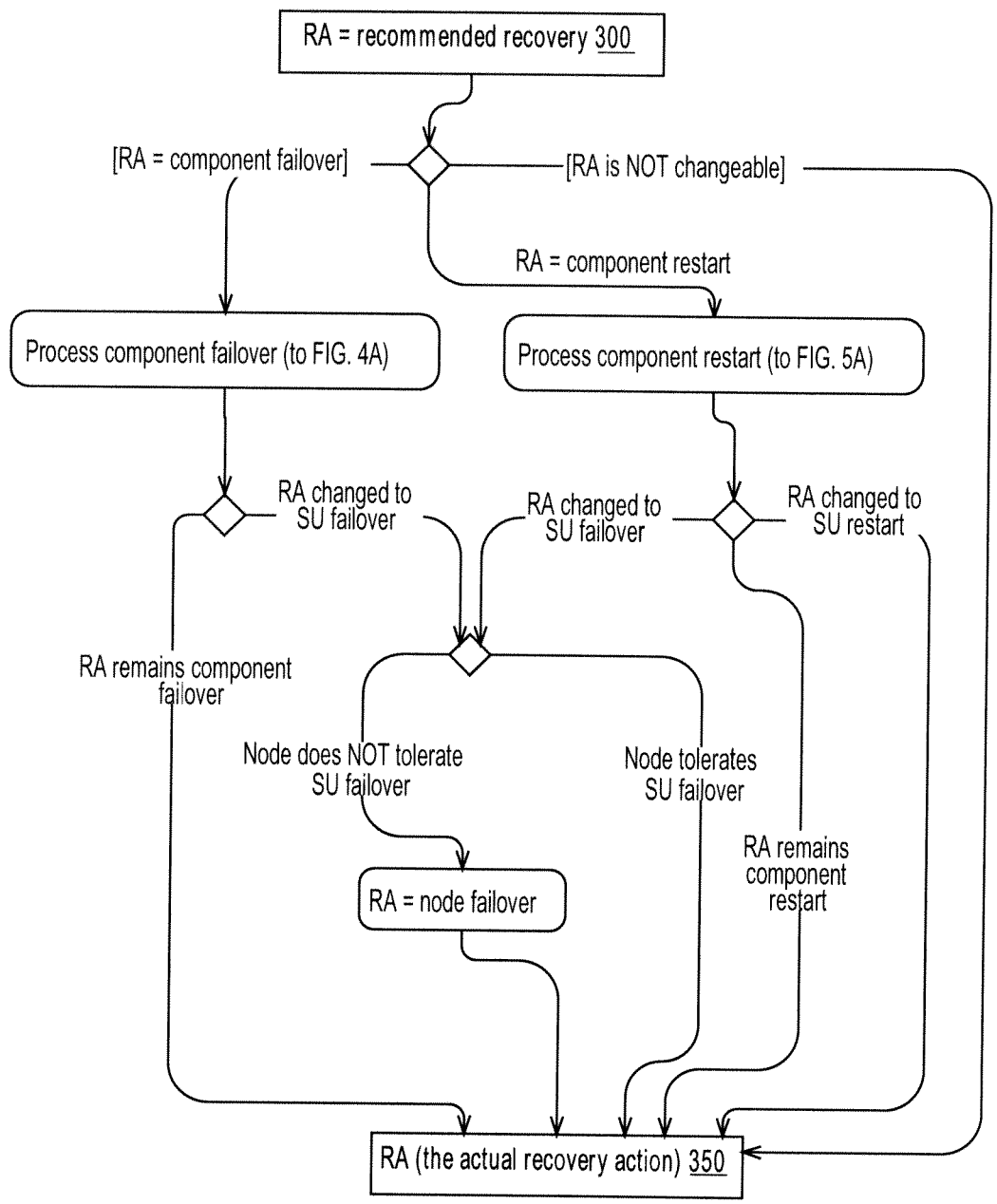
FIG. 3 is a diagram illustrating a first step of an actual recovery analysis according to one embodiment of the invention.

FIG. 3 is a flowchart illustrating the actual recovery analysis according to one embodiment of the invention. The analysis takes as input the recommended recovery (300) for the failure being analyzed. Based on the recommended recovery, the analysis can branch either to the component restart flowchart illustrated in FIG. 4A-B, or to the component failover flowchart illustrated in FIG. 5A-B to determine if SU level recovery is needed. After either of these flowcharts (FIGS. 4A-B or 5A-B) returns a recovery value, the recovery value is examined further to verify whether or not it needs to mutate to a node failover. The recovery action (RA) produced as the output (350) of the flowchart of FIG. 3 is the actual recovery that AMF will perform at runtime in case the failure type is detected on the component for which the recommended recovery has been analyzed. This actual recovery information (as the class 240 of FIG. 2) can be added to the AMF configuration 200 (FIG. 2) in association with the failure type analyzed. Once all failure types have been analyzed for a given component, these failure types can be normalized based on their established actual recovery. That is, if two failure types resulted in the same actual recovery, their rates can be added up and the sum becomes the rate associated with the actual recovery (characterized in an attribute accumulatedRate). This normalization is performed for a component until the component has no two failure types associated with the same actual recovery.

III. Mapping the AMF configuration to a stochastic analysis model. As mentioned earlier, the quantification of availability can be performed by solving a stochastic model that describes the states that the system entities may undergo at runtime, including failure and recovery. In one embodiment, the stochastic model is defined using the formalism of a Petri net model, such as the Deterministic and Stochastic Petri Net (DSPN) or the Stochastic Activity Networks (SANs). A Petri net is a mathematical modeling language for the description of distributed systems. A Petri net can be described by a directed graph, in which the bars represent transitions, the hollowed circles represent states, and the arrows connect states to transitions or transitions to states. A state may include one or more tokens (denoted by filled circles). A transition of a Petri net may fire (i.e., be enabled) whenever a guard condition is met and other predefined conditions (if any) are satisfied. When a transition fires, it consumes one or more tokens from each of its input arrows and places one or more token at each of its output arrows. DSPNs are a subclass of a Petri net that support immediate (denoted by vertical lines), timed (denoted by filled bars) and stochastic (denoted by hollowed bars) transitions from one state to another. DSPNs can be used to describe the structure and behavior of the entities managed by the AMF. Although DSPNs are described herein, it is understood that different stochastic models (e.g., Markov chains) may also be used.

In one embodiment, a set of DSPN templates have been defined for the purpose of mapping the AMF configuration to the stochastic analysis model. Each template captures a particular AMF configuration entity with all its possible variations with respect to the availability analysis. That is, a template is chosen based on what kind of configuration entity (e.g., component, node, SI, SU, etc.) that the template is used to describe. In addition, DSPN templates are defined for service associations that capture the potential associations between a service provider entity and the services it may provide. In addition, the template instances can be annotated with proper values derived from the AMF configuration attribute values, e.g., transition rates and enabling conditions. That is, the instances of these templates capture the AMF behavior of service assignment, service recovery and dependencies.

In one embodiment, the mapping can be performed as follows:
1. Each AMF configuration entity is mapped to an instance of the corresponding DSPN template that has been defined to describe the entity's runtime behavior.
2. For each CSI that a component may support, an instance of the appropriate DSPN template of the service association is created. The same process is followed for each SU and its potential SI associations.
3. The DSPN timed transitions are set according to the related time attributes of the AMF configuration. The stochastic transition's rates associated with the recovery states of the DSPN model are set based on the normalized failures rate values for the appropriate actual recovery obtained through the actual recovery analysis.
4. The assignment preferences included in the AMF configuration are expressed using transition priorities and guard conditions.
5. The dependencies in the system and the other entity properties are also captured through the guard conditions.

Note that for a particular AMF configuration entity, Steps 1 and 2 described above must come before Steps 3, 4, 5; however, the order of execution of Step 1 and 2 is not important. Likewise, the order of execution of Steps 3, 4 and 5 is not important.

Some timed transitions used in the templates are not specified in the AMF configuration (e.g., the time needed to start a node), and therefore are specified by a user (e.g., a system integrator). The source for these values may be the vendor or benchmarks.

Step 5 described above captures the dependencies in the system that includes structural dependencies and functional dependencies. The structural dependencies describe the AMF configuration hierarchy which includes cluster, node, application, SU, component, SI and CSI. The functional dependencies include instantiation dependency (which describes the order of instantiation), assignment dependency (e.g., proxy-proxied relationship), service provision dependency (e.g., tolerance time without a sponsor), and life cycle dependency (e.g., container-contained relationship).

For correct mapping of timed transitions in Steps 3-5 of the mapping operation described above, it is necessary to decompose the actual recovery actions. Any recovery performed by AMF is executed on the components of the application. Therefore, to resolve the service recovery, each possible actual recovery is decomposed to the component level to determine how services are affected. The notion of atomic action is defined to further decompose the recovery performed on the component. These reflect the actual commands issued by AMF to/on the component to perform the recovery; e.g., a SU restart recovery action is decomposed into the restart recovery of each of its components. In turn, the component restart recovery action (for a healthy component) is the compilation of the following atomic actions: remove workload if any; terminate component; instantiate component; and reassign the workload if any. If the same recovery (i.e., component restart) is performed on a faulty component, it will be carried out differently from the healthy components. In case of SU restart example, if the SU groups two components, the faulty one will be "cleaned up" with assistance from the operating system that will abruptly terminate it without removing its workload; while the healthy one will be gracefully terminated as described above. Each actual recovery decomposition is reflected as a set of states and timed transitions in the appropriate templates.

One motive for decomposing recoveries to the atomic level is that the timing information available in the configuration is only specified at this level through the notion of timeouts associated with the atomic actions. For example, the instantiation timeout reflects the maximum tolerated time between the issuance of the instantiate command by the AMF and the component registration, which indicates that the component is successfully instantiated. When this timeout is exceeded, the AMF will assume that the instantiation has failed and it will proceed as appropriate for the failure. As a result this information can be derived from the AMF configuration and this information can be used as the times associated with the related timed transition in the template instance.

The different atomic actions within the recovery need to be synchronized and sequenced properly when they are executed. There are several factors that influence the sequence in which the list of atomic actions are executed. These factors are classified into three categories:

a. Recovery action semantics: This reflects the rationale behind the execution of the recovery; e.g., the restart is executed differently for an application than for a SU. To prevent the preservation of any faulty state, the application restart is performed as the abrupt termination of all components of the application first, before proceeding with their re-instantiation. At the same time, this ordering is not a requirement for the SU restart. Accordingly the transitions representing the re-instantiation of components are guarded by the application a component belongs to, but not by its SU.

b. Service dependency: It indicates required services and implies that these sponsoring services must be assigned before the dependent one can be assigned. This applies even if the components providing the dependent services are instantiated first. Service dependency may lead to recovery propagation. The recovery propagation occurs when the outage caused by the recovery of the service provided by one component exceeds the tolerance time of those components depending on it. As the recovering service is a pre-requisite for the services provided by those other components, the recovery is said to "propagate" from the one component to those other components. When mapping to a stochastic model, the service dependency and tolerance time can be captured by a timed guard that controls the transition between states.

c. Life cycle dependency: It expresses component dependency and specifies the order in which components are terminated and instantiated. Life cycle dependency is implied in some cases (e.g. contained and container) while it is specified explicitly as instantiation order in others.

Service dependency is distinguished from life cycle dependency. Specifically, service dependency is a dependency at the service functionality level. That is, a component cannot deliver a service unless another sponsoring component is facilitating this task. Service dependency is reflected by guarded and optionally also timed transition of the service template, where the sponsor service guards the dependent one and the dependent's tolerance time determines the time.

On the other hand, life cycle dependency indicates that not only the functionality but the component life cycle depends on the service of another sponsoring component. This is typically the case when the sponsor component provides an execution environment where the dependent (contained) one is running; e.g., a component deployed in a virtual machine, which itself is a container component. When the virtual machine is faulty, restarting it will result in terminating the components running on this machine, which impacts any services they provide. The life cycle dependency also dictates an instantiation order of the components, in the sense that the sponsoring components must be instantiated and assigned the service first. The peculiarity of this case is that the outage of the sponsor may trigger not only the outage of the dependent, but also additional recovery actions; e.g., a failover of the services provided by the contained components. Again the synchronization is done through guarded transitions between the appropriate components as well as their services.

In some embodiments, there may be the case where both of the above dependencies are combined. That is, a container component cannot provide the service of containing other components unless another component is providing its service. An example of such dependency is when the container depends on a resource allocation component. When the latter component fails, and the resources needed for containment become unavailable, the container can no longer support its contained components, and therefore a recovery action must be triggered (typically failing over) to avoid the outage of the services provided by the contained components.

The dependency analysis described above is performed for the purpose of mapping the input AMF configuration to a stochastic model. An example stochastic model is DSPN, which includes states and transitions. The transitions are defined, at least in part, based on the results from the dependency analysis. Other stochastic models may use other construct to represent the deterministic and non-deterministic aspects of system behavior. After the stochastic model is built, it can be solved to obtain the estimated service availability of each service instance in the input AMF configuration.

IV. The estimation of service availability: Solving the stochastic model. There are several ways to quantify the availability. For instance, one method may be to associate the service being provided with a particular state, and then calculate the probability of being in this state at steady state (i.e., when time t=infinity).

In the DSPN model described herein, for each SI one state is defined that reflects the service being provided. Thus, whenever the SI is not in this state it is considered not provided. This value can be generated by a known solver tool. Note that by having only one state representing the provided state, a wider range of tools are applicable.

Figure 6:
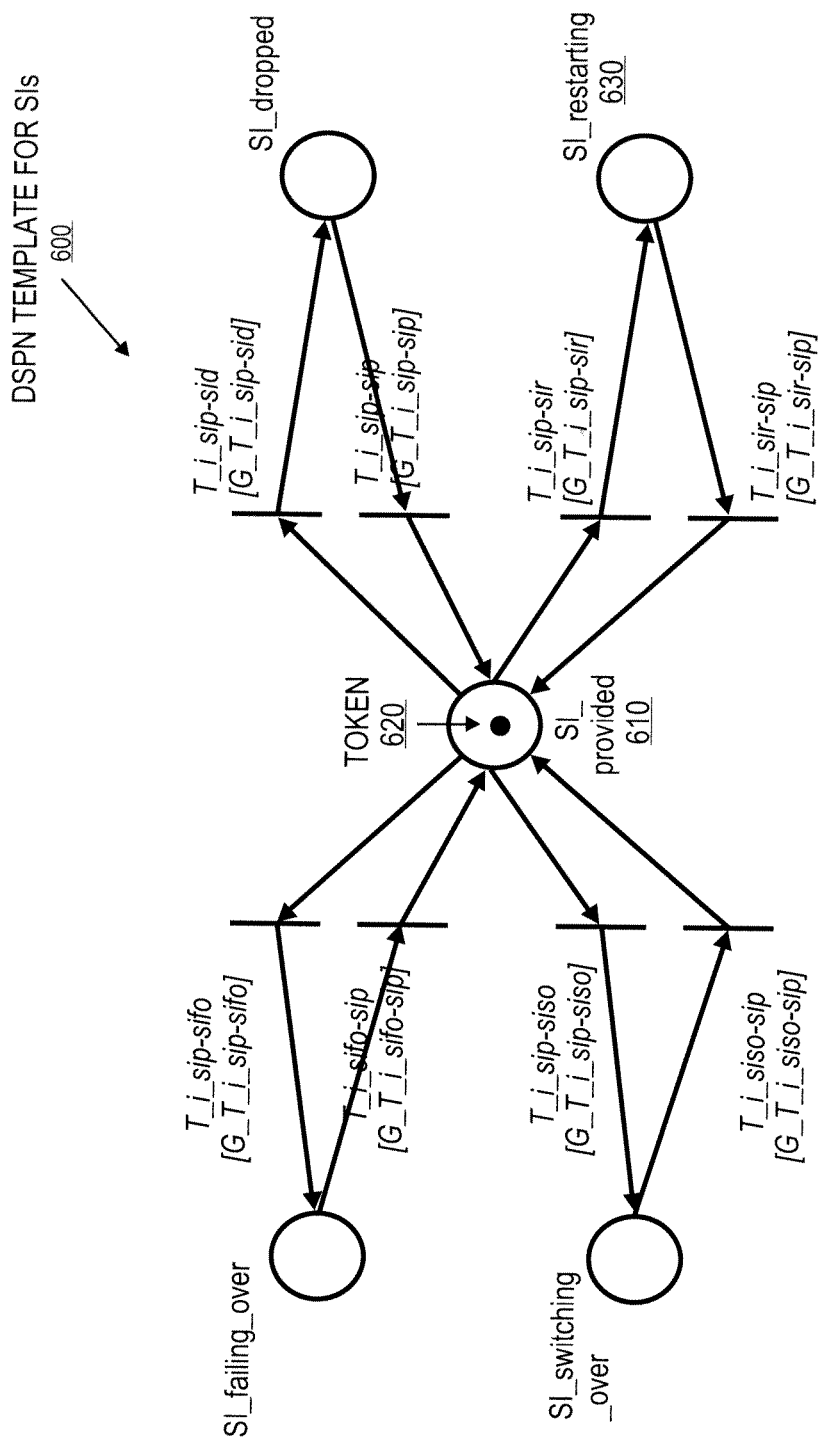
FIG. 6 illustrates an example of a stochastic model for service-instances according to one embodiment of the invention.

FIG. 6 illustrates an example of a DSPN template 600 representing SIs according to one embodiment of the invention. The DSPN template 600 includes states (hollowed circles) and immediate transitions (vertical lines). In some embodiments, the immediate transitions can be replaced by timed transitions with a negligible delay (e.g., nano-seconds). For a DSPN instance of this template 600, which represents a particular SI, a token 620 (filled circle) is in an SI_provided state 610 as long as this SI is provided. However, the token will leave this state and transition to another state depending on the state of the components serving the SI's composite CSIs.

Figure 7:
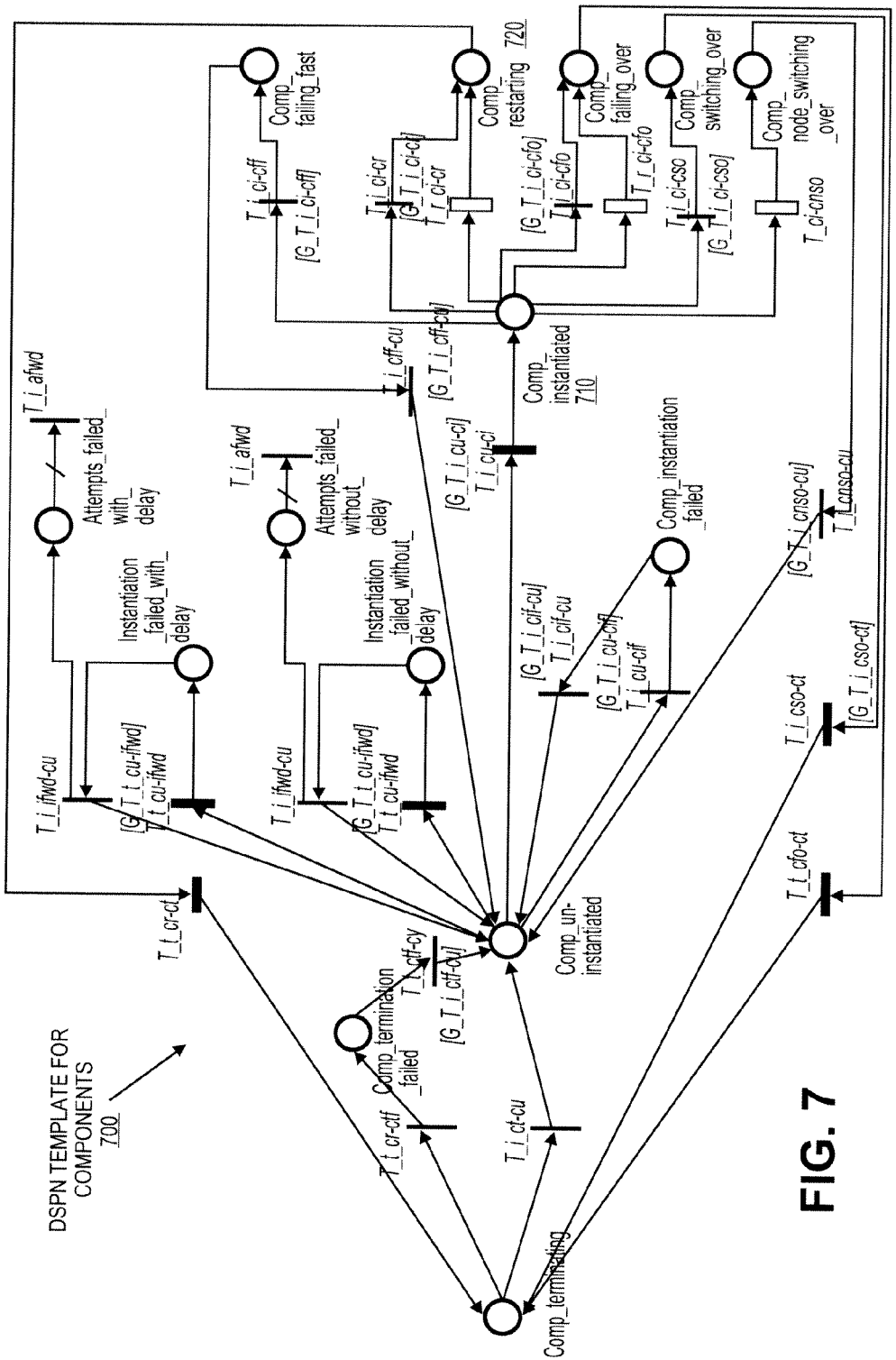
FIG. 7 illustrates an example of a stochastic model for components according to one embodiment of the invention.

FIG. 7 illustrates an example of a DSPN template 700 representing components according to one embodiment of the invention. An instance of the DSPN template 700 represents a particular component and contains one token (not shown). If, in this DSPN instance, the token is in any state other than a Component_instantiated state 710, this component is not able to provide any CSIs even if there is one assigned to it.

Accordingly, when any of the components serving any of the CSIs of the SI being analyzed goes into a restarting state 720, the guard on the transition (G_T_i_sip-sir) that allows the token 620 (FIG. 6) to move to a SI_restarting state 630 becomes enabled. Thus, for the purpose of the availability analysis, the SI is not considered as provided anymore. The token 620 remains in the SI_restarting state 630 until all the guard conditions (namely, G_T_i_sir-sip) are met to enable the transition that places the token 620 back to the SI_provided state 610.

In addition to the DSPN templates 600 and 700, other DSPN templates have been defined to describe AMF configuration entities such as node, SU, Application etc. Thus, a complete DSPN model including DSPN instances of various DSPN templates can be generated from the input AMF configuration. By solving this complete DSPN model, the availability of each SI can be estimated. The availability is equal to the probability of having the token 620 in the SI_provided state 610 at steady state for the DSPN instance representing the SI. That is, a probability of 0.99998 of having the token in the SI_provided state 610 at steady state—calculated by a solver tool—indicates that the anticipated availability of the represented SI (or equivalently, the percentage of time the SI is provided) is 99.998%. This steady state solution is an indication of how likely it is to obtain a service represented as an SI in the input AMF configuration. The DSPN model can also be used to solve for reliability of a SI, which indicates how long it takes for the SI to go down after it has been provided.

Thus, an AMF configuration can be characterized by the level of availability that it supports each of the SIs. Therefore, system administrators will be able to select for deployment the configuration that best suits their specific needs. Alternatively, system administrators can verify before deployment if a new configuration will be able to satisfy the availability requirements imposed by the relevant SLAs.

Figure 8:
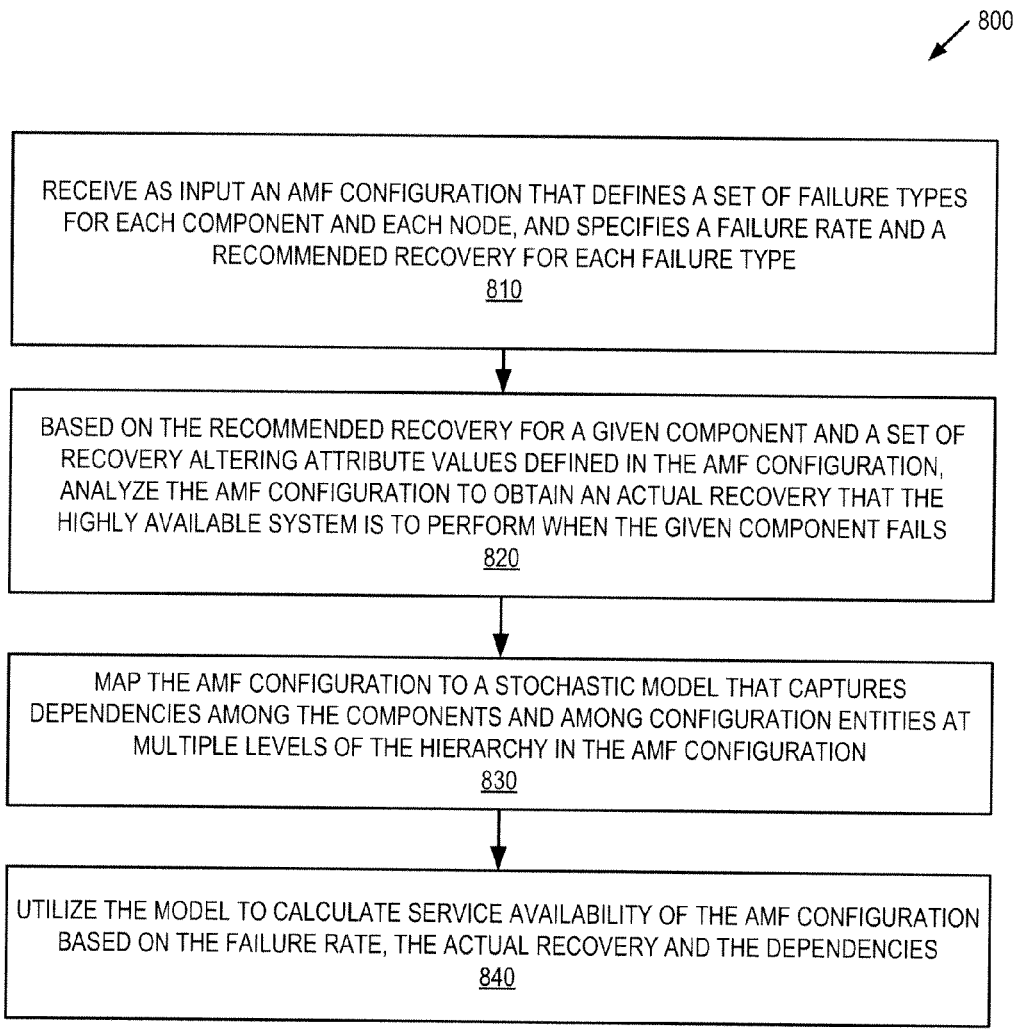
FIG. 8 is a flow diagram illustrating a method of evaluating service availability for AMF configurations according to one embodiment of the invention.

FIG. 8 is a flow diagram illustrating a method 800 of evaluating service availability from an AMF configuration according to one embodiment of the invention. The AMF configuration describes how configuration entities of a highly available system are grouped and comprising information on service provision and service protection policies against resource failure. The AMF configuration includes a hierarchy of the configuration entities, with components being at a lowest level in the hierarchy. The method 800 may be performed by hardware (e.g., circuitry, dedicated logic, programmable logic, microcode, etc.), software (e.g., instructions run on a processing device), or a combination thereof. In one embodiment, the method 800 is performed by a computer system 900 of FIG. 9.

Referring to FIG. 8, in one embodiment, the method 800 begins with a computer system receiving the AMF configuration as input, where the AMF configuration defines, for each component, multiple failure types (e.g., crash, timeout, out of memory, etc.). For each failure type, the AMF configuration specifies a failure rate and a recommended recovery (e.g., restart for crash, failover for timeout, node failfast for out of memory, etc.) (block 810). The computer system analyzes the AMF configuration, based on the recommended recovery for a given one of the components and a set of recovery altering attribute values defined in the AMF configuration, to obtain an actual recovery that the highly available system is to perform when the given component fails (block 820). The recovery altering attribute values are defined for the configuration entities at the multiple levels of the hierarchy. The computer system maps the AMF configuration to a stochastic model that captures the dependencies among the components and among the configuration entities at the multiple levels of the hierarchy (block 830). Based on the failure rate, the actual recovery and the dependencies, the computer system utilizes the model to calculate the service availability of the AMF configuration to thereby determine the availability of the services provided by the highly available system (block 840).

In one embodiment, the stochastic model is a DSPN model and the service availability is obtained by solving the DSPN model.

Figure 9:
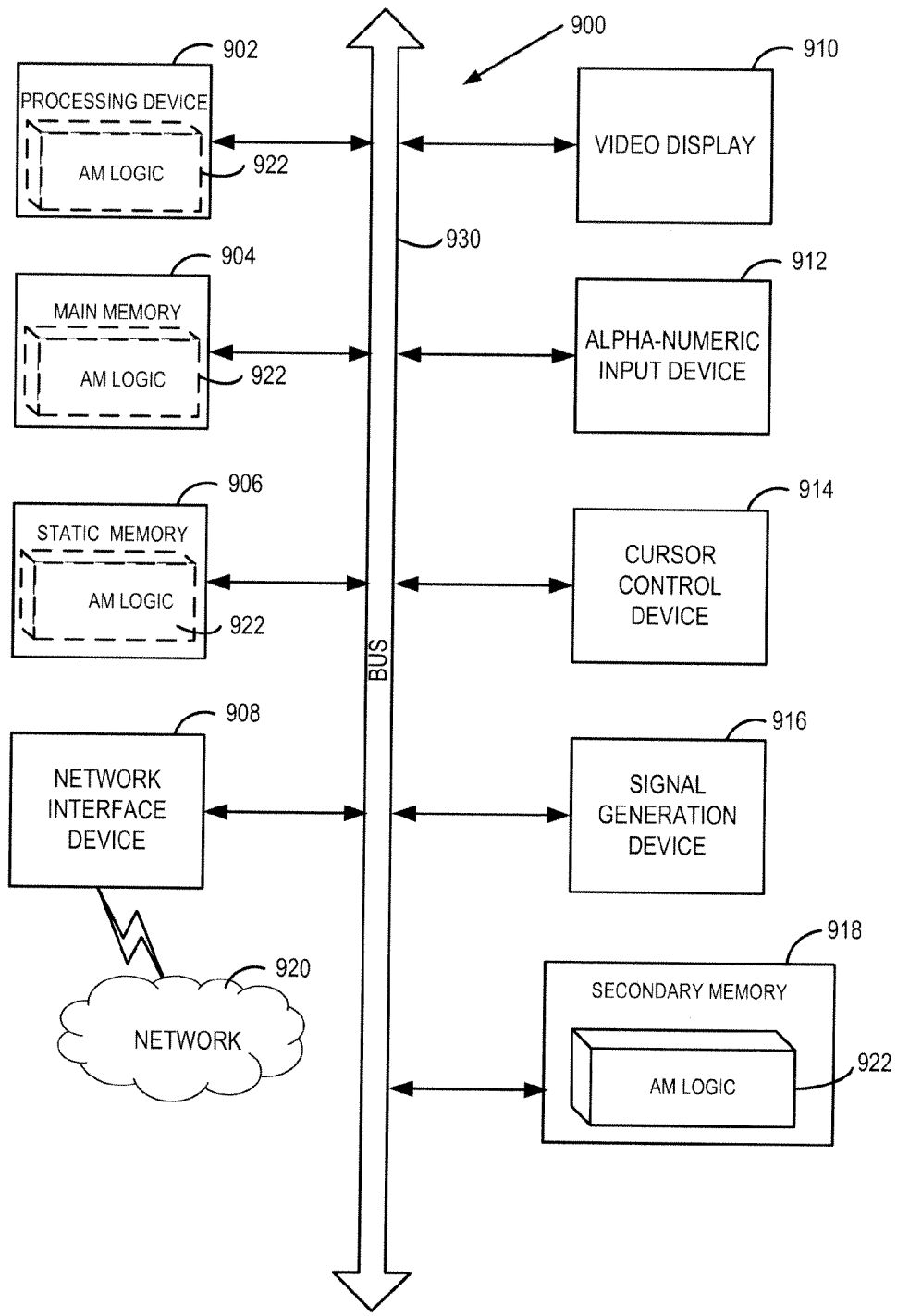
FIG. 9 illustrates a diagrammatic representation of a computer system according to one embodiment of the invention.

FIG. 9 illustrates a diagrammatic representation of a machine in the exemplary form of a computer system 900 within which a set of instructions, for causing the machine to perform any one or more of the methodologies discussed herein, may be executed. The computer system 900 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 900 includes a processing device 902 coupled to a non-transitory computer readable storage medium, such as: a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930. The computer readable storage medium may also include any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, or any type of media suitable for storing electronic instructions.

The processing device 902 represents one or more general-purpose processing devices, each of which can be: a microprocessor, a central processing unit (CPU), a multicore system, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. In one embodiment, the processing device 902 is adapted to execute AM logic 922 for performing the operations and steps of evaluating service availability from an AMF configuration as described above (e.g., the methods illustrated and described in connection with FIG. 8). In one embodiment, the AM logic 922 may be incorporated into the AMF middleware, or can be separated from the AMF middleware to perform analysis at configuration time.

The computer system 900 may further include a network interface device 908. A part or all of the AM logic 922 may be transmitted or received over a network 920 via the network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

In one embodiment, the AM logic 922 may be stored in the non-transitory computer readable storage medium of the secondary memory 918 and/or the static memory 906. The AM logic 922 may also reside, completely or at least partially, within the main memory 904 and/or within the processing device 902 during execution thereof by the computer system 900. The AM logic 922 may be stored in the same computer system 900 or distributed on multiple computer systems 900.

The term "non-transitory computer readable storage medium" should be taken to include a single medium or multiple media (e.g., a centralized or distributed database, and/or associated caches and servers) that store the one or more sets of instructions.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagram of FIG. 8 have been described with reference to the exemplary embodiment of FIG. 9. However, it should be understood that the operations of the flow diagrams of FIG. 8 can be performed by embodiments of the invention other than those discussed with reference to FIG. 9, and the embodiment discussed with reference to FIG. 9 can perform operations different than those discussed with reference to the flow diagram. While the flow diagram of FIG. 8 shows a particular order of operations performed by certain embodiments of the invention, it should be understood that such order is exemplary (e.g., alternative embodiments may perform the operations in a different order, combine certain operations, overlap certain operations, etc.).

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method for evaluating service availability of an Availability Management Framework (AMF) configuration, the AMF configuration describing how configuration entities of a highly available system are grouped and comprising information on service provision and service protection policies against resource failure, the AMF configuration comprising a hierarchy of the configuration entities, wherein components are at a lowest one of a plurality of levels in the hierarchy and nodes provide an execution environment for the components, the method comprising the steps of:

receiving the AMF configuration as input, the AMF configuration defining a set of failure types for each of the components and each of the nodes, and specifying a failure rate and a recommended recovery for each of the failure types;

analyzing the AMF configuration, based on the recommended recovery for a given one of the components and a set of recovery altering attribute values defined in the AMF configuration, to obtain an actual recovery that the highly available system is to perform when the given component fails, wherein the recovery altering attribute values are defined for the configuration entities at the plurality of levels of the hierarchy;

mapping the AMF configuration to a stochastic model that captures dependencies among the components and among the configuration entities at the plurality of levels of the hierarchy; and utilizing the model to calculate the service availability of the AMF configuration based on the failure rate, the actual recovery and the dependencies to thereby estimate availability of services to be provided by the highly available system.

2. The method of claim 1, wherein the stochastic model incorporates the dependencies into guard conditions that specify when a transition is to occur.

3. The method of claim 1, wherein the step of analyzing the AMF configuration further comprising:

determining whether the recommended recovery is changeable; and determining whether the recommended recovery is component failover or component restart, if the recommended recovery is changeable.

4. The method of claim 1, wherein the stochastic model supports timed transitions, which are set based on time attributes of the AMF configuration.

5. The method of claim 1, wherein the stochastic model supports stochastic transitions, wherein the stochastic transitions associated with recovery states are set based on failures rate values associated with actual recoveries.

6. The method of claim 1, wherein the AMF configuration comprises a set of service instances and wherein the step of calculating the service availability further comprises the steps of:

mapping each of the service instances into a service instance template of the stochastic model; and evaluating a probability that the service instance is in a provided state at steady state.

7. The method of claim 1, wherein the dependencies comprises service dependency, which is associated with an order in which services are assigned, and life cycle dependency, which is associated with instantiation and termination of the components.

8. A computer system adapted to evaluate service availability of an Availability Management Framework (AMF) configuration, the AMF configuration describing how configuration entities of a highly available system are grouped and comprising information on service provision and service protection policies against resource failure, the AMF configuration comprising a hierarchy of the configuration entities, wherein components are at a lowest one of a plurality of levels in the hierarchy and nodes provide an execution environment for the components, the computer system comprising:

a memory to store:
the AMF configuration, which defines a set of failure types for each of the components and each of the nodes, and specifies a failure rate and a recommended recovery for each of the failure types; and a processor coupled to the memory, the processor adapted to:
receive the AMF configuration as input;
analyze the AMF configuration, based on the recommended recovery for a given one of the components and a set of recovery altering attribute values defined in the AMF configuration, to obtain an actual recovery that the highly available system is to perform when the given component fails, wherein the recovery altering attribute values are defined for the configuration entities at the plurality of levels of the hierarchy;
map the AMF configuration to a stochastic model that captures dependencies among the components and among the configuration entities at the plurality of levels of the hierarchy; and
utilize the model to calculate the service availability of the AMF configuration based on the failure rate, the actual recovery and the dependencies to thereby estimate availability of services to be provided by the highly available system.

9. The computer system of claim 8, wherein the stochastic model incorporates the dependencies into guard conditions that specify when a transition is to occur.

10. The computer system of claim 8, wherein the processor is further adapted to:
determine whether the recommended recovery is changeable; and
determine whether the recommended recovery is component failover or component restart, if the recommended recovery is changeable.

11. The computer system of claim 8, wherein the stochastic model supports timed transitions, which are set based on time attributes of the AMF configuration.

12. The computer system of claim 8, wherein the stochastic model supports stochastic transitions, wherein the stochastic transitions associated with recovery states are set based on failures rate values associated with actual recoveries.

13. The computer system of claim 8, wherein the AMF configuration comprises a set of service instances and wherein the processor is further adapted to:
map each of the service instances into a service instance template of the stochastic model; and
evaluate a probability that the service instance is in a provided state at steady state.

14. The computer system of claim 8, wherein the dependencies comprises service dependency, which is associated with an order in which services are assigned, and life cycle dependency, which is associated with instantiation and termination of the components.

15. A non-transitory computer readable storage medium having stored therein instructions that, when executed by a computer system, cause the computer system to perform a method of evaluating service availability of an Availability Management Framework (AMF) configuration, the AMF configuration describing how configuration entities of a highly available system are grouped and comprising information on service provision and service protection policies against resource failure, the AMF configuration comprising a hierarchy of the configuration entities, wherein components are at a lowest one of a plurality of levels in the hierarchy and nodes provide an execution environment for the components, the method comprising the steps of:

receiving the AMF configuration as input, the AMF configuration defining a set of failure types for each of the components and each of the nodes, and specifying a failure rate and a recommended recovery for each of the failure types;
analyzing the AMF configuration, based on the recommended recovery for a given one of the components and a set of recovery altering attribute values defined in the AMF configuration, to obtain an actual recovery that the highly available system is to perform when the given component fails, wherein the recovery altering attribute values are defined for the configuration entities at the plurality of levels of the hierarchy;
mapping the AMF configuration to a stochastic model that captures dependencies among the components and among the configuration entities at the plurality of levels of the hierarchy; and
utilizing the model to calculate the service availability of the AMF configuration based on the failure rate, the actual recovery and the dependencies to thereby estimate availability of services to be provided by the highly available system.

16. The non-transitory computer readable storage medium of claim 15, wherein the stochastic model incorporates the dependencies into guard conditions that specify when a transition is to occur.

17. The non-transitory computer readable storage medium of claim 15, wherein the step of analyzing the AMF configuration further comprising:
determining whether the recommended recovery is changeable; and
determining whether the recommended recovery is component failover or component restart, if the recommended recovery is changeable.

18. The non-transitory computer readable storage medium of claim 15, wherein the stochastic model supports timed transitions, which are set based on time attributes of the AMF configuration.

19. The non-transitory computer readable storage medium of claim 15, wherein the stochastic model supports stochastic transitions, wherein the stochastic transitions associated with recovery states are set based on failures rate values associated with actual recoveries.

20. The non-transitory computer readable storage medium of claim 15, wherein the AMF configuration comprises a set of service instances and wherein the step of calculating the service availability further comprises the steps of:
mapping each of the service instances into a service instance template of the stochastic model; and
evaluating a probability that the service instance is in a provided state at steady state.

21. The non-transitory computer readable storage medium of claim 15, wherein the dependencies comprises service dependency, which is associated with an order in which services are assigned, and life cycle dependency, which is associated with instantiation and termination of the components.

* * * * *

UNITED STATES PATENT AND TRADEMARK OFFICE
CERTIFICATE OF CORRECTION

PATENT NO. : 8,738,968 B2  
APPLICATION NO. : 13/403650  
DATED : May 27, 2014  
INVENTOR(S) : Kanso et al.

Page 1 of 1

It is certified that error appears in the above-identified patent and that said Letters Patent is hereby corrected as shown below:

On the title page, item (56), under "OTHER PUBLICATIONS", in Column 2, Line 1, delete "Report PCT/IB2010/051051 dated Jun. 19 2012." and insert -- Report, PCT/IB2010/051051 dated Jun. 19, 2012. --, therefor.

On title page 2, item (56), under "OTHER PUBLICATIONS", in Column 1, Line 22, delete "Servie" and insert -- Service --, therefor.

In the Specification

Column 1, Line 54, delete "User-Perceived Perceived Service Availability" In" and insert -- User-Perceived Service Availability". In --, therefor.

Column 1, Lines 65-66, delete "Majzik, Mura," and insert -- I. Majzik, I. Mura, --, therefor.

Column 2, Line 60, delete "limitation in" and insert -- limitation, in --, therefor.

Figure 4A:
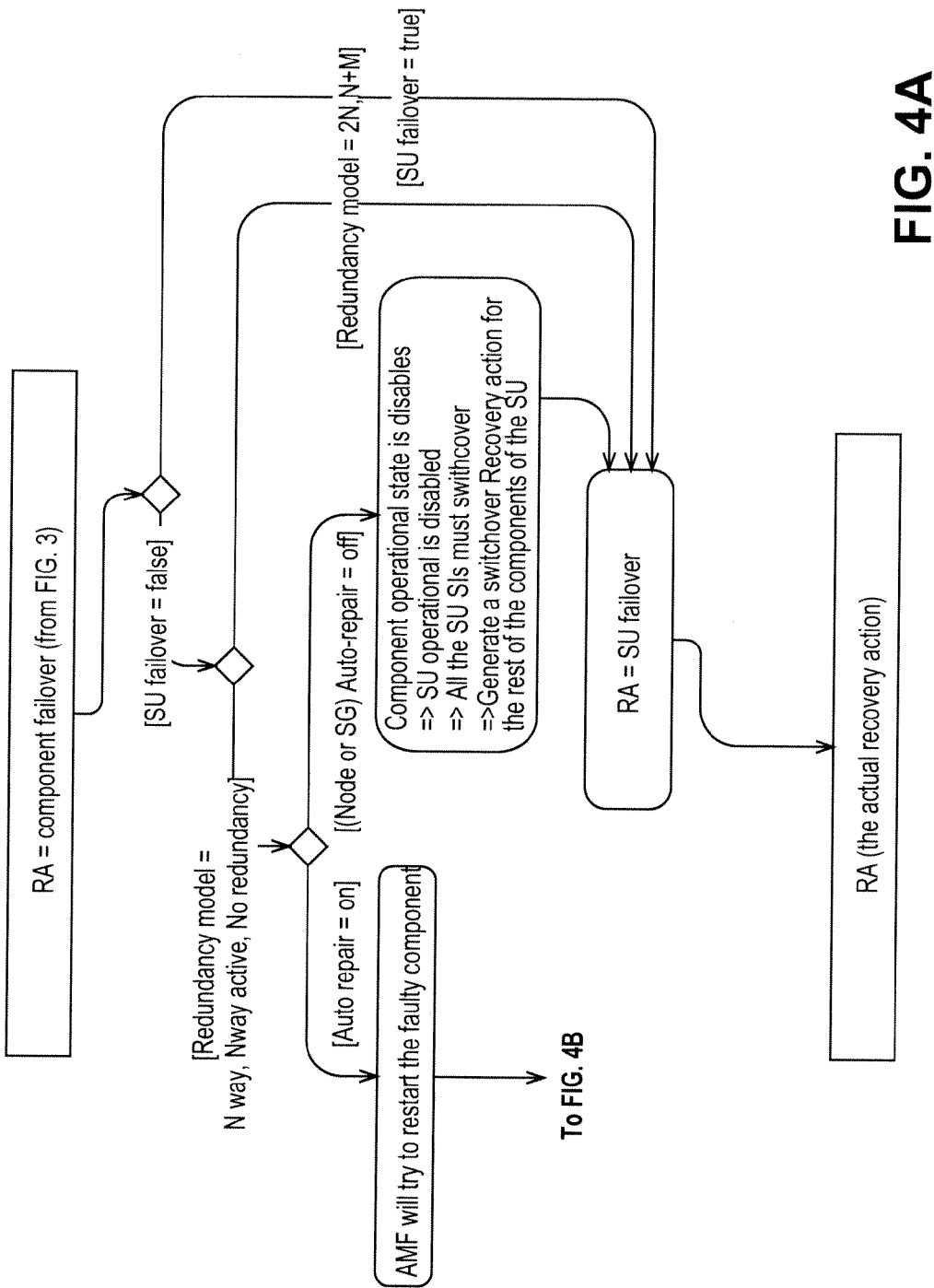
FIGS. 4A and 4B are diagrams illustrating an actual recovery analysis for component failover according to one embodiment of the invention.
Figure 4B:
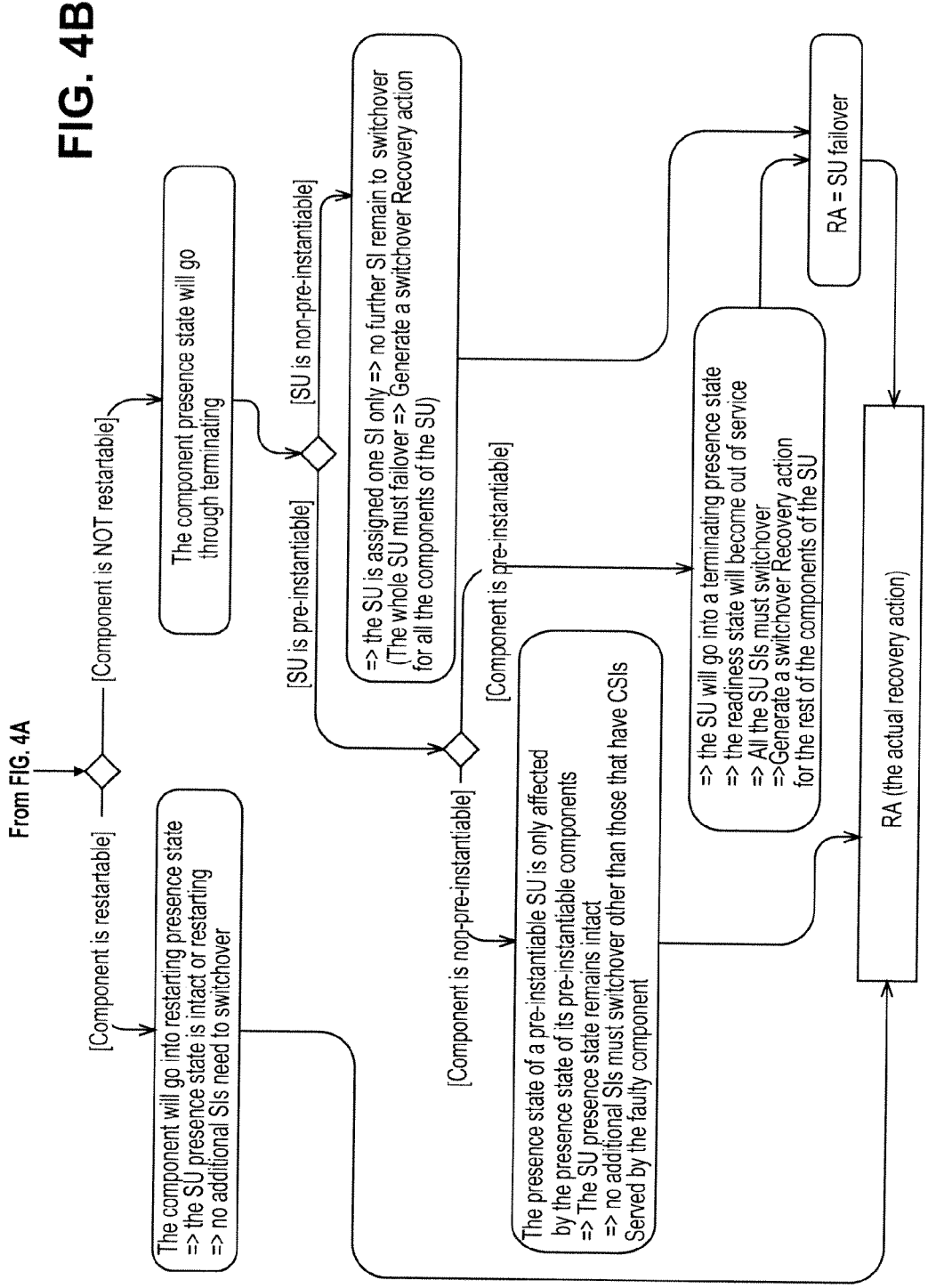

Column 7, Line 12, delete "FIG. 4A-B," and insert -- FIGS. 4A-B, --, therefor.

Figure 5A:
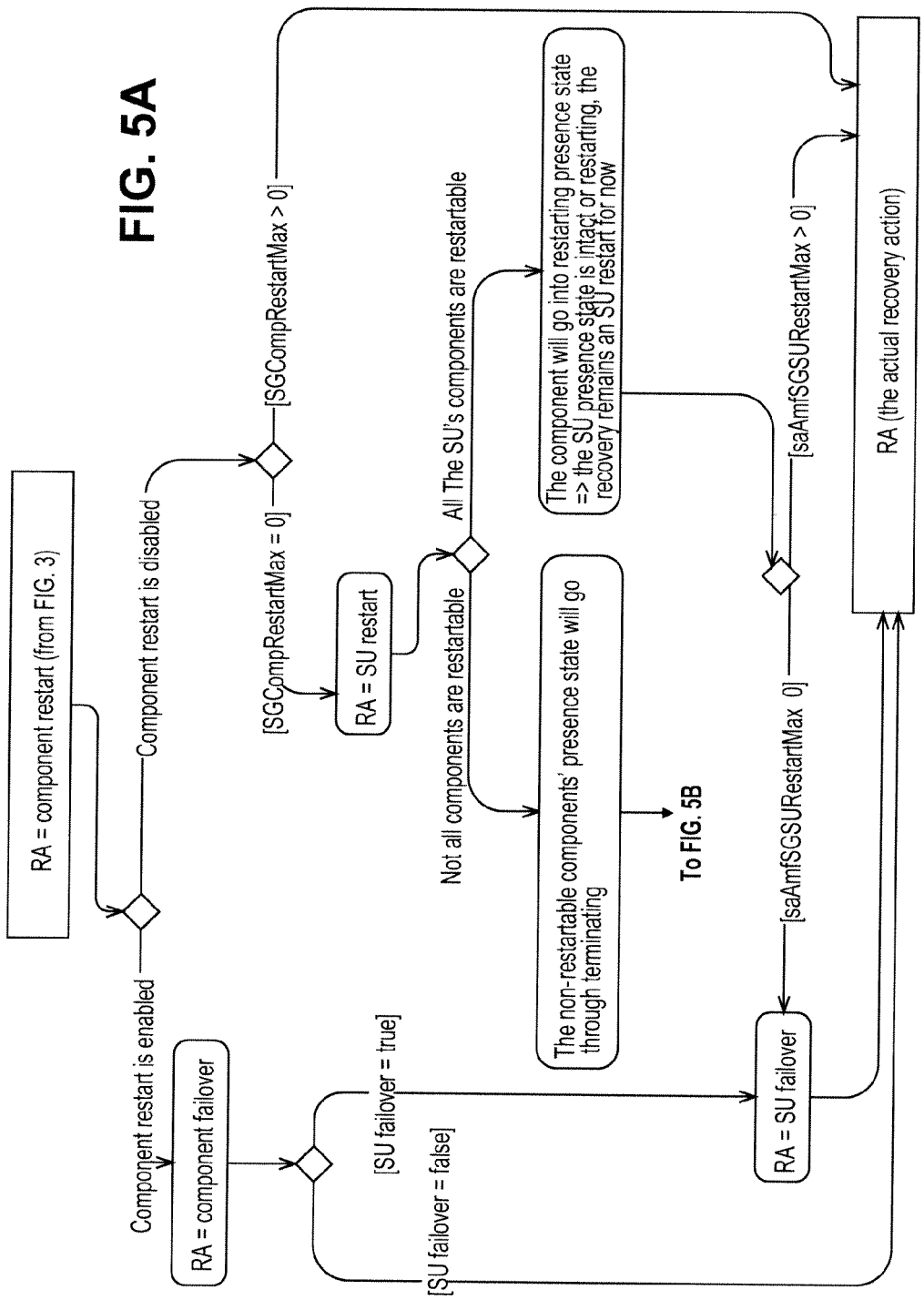
FIGS. 5A and 5B are diagrams illustrating an actual recovery analysis for component restart according to one embodiment of the invention.
Figure 5B:
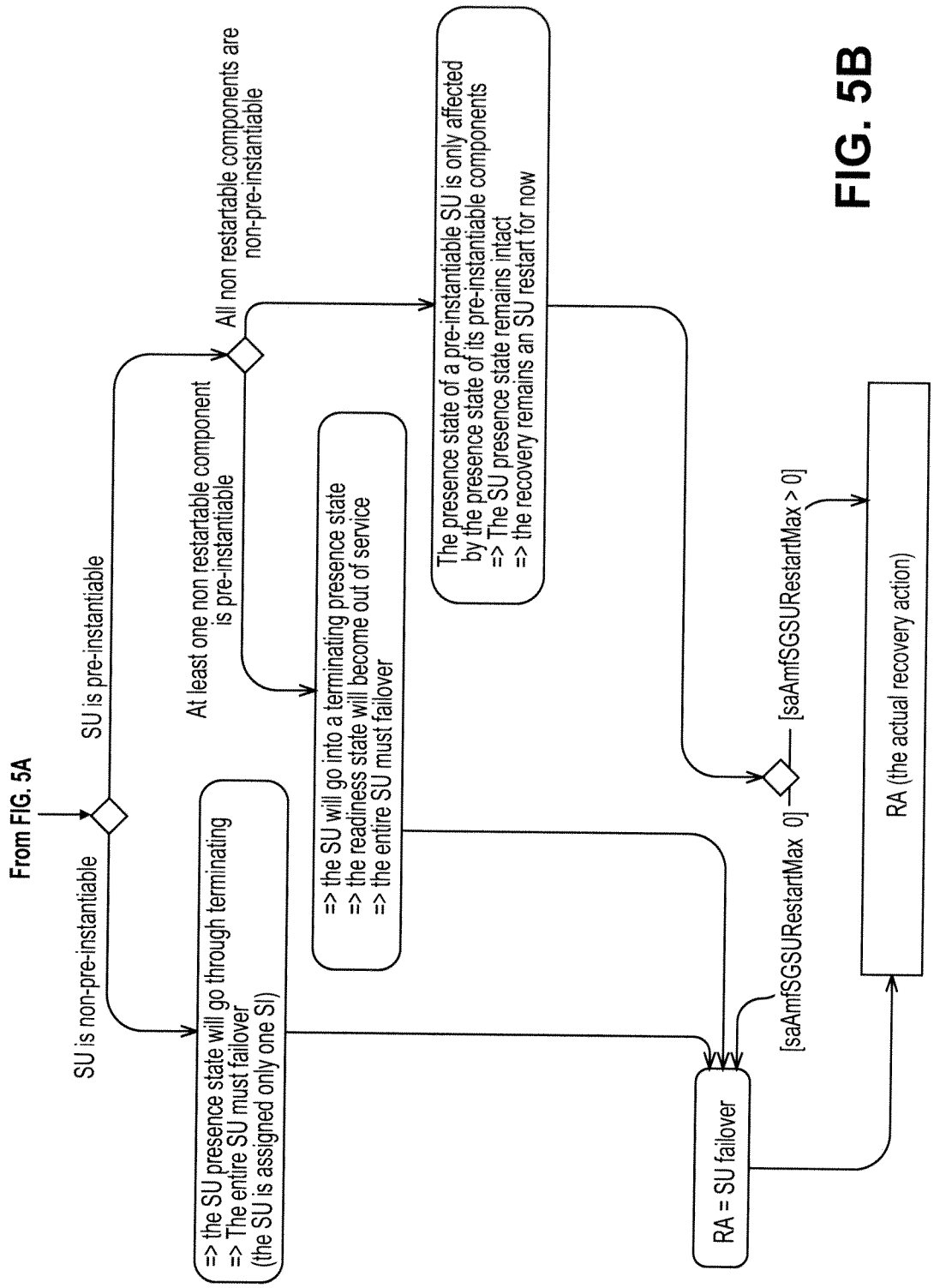

Column 7, Line 13, delete "FIG. 5A-B" and insert -- FIGS. 5A-B --, therefor.

Signed and Sealed this  
Fourth Day of November, 2014

Michelle K. Lee  
*Deputy Director of the United States Patent and Trademark Office*